H. L. GOTTSCHALK.
ADJUSTABLE LURE WABBLER.
APPLICATION FILED FEB. 7, 1921.

1,389,644.

Patented Sept. 6, 1921.

Witnesses
Geo. I. Lawrence
Arthur C. Wright

Inventor,
Henry L. Gottschalk,
By Charles Turner Brown,
Attorney.

UNITED STATES PATENT OFFICE.

HENRY L. GOTTSCHALK, OF CHICAGO, ILLINOIS.

ADJUSTABLE LURE-WABBLER.

1,389,644.  Specification of Letters Patent.  Patented Sept. 6, 1921.

Application filed February 7, 1921. Serial No. 443,187.

*To all whom it may concern:*

Be it known that I, HENRY L. GOTTSCHALK, a citizen of the United States, and a resident of Chicago, in the county of Cook and State of Illinois, have invented certain new and useful Improvements in Adjustable Lure-Wabblers, of which the following, when taken in connection with the drawing accompanying and forming a part hereof, is a specification.

This invention relates to lures which are used in the place of bait for catching game fish, so called.

Among the objects of the invention is to obtain a wabbler provided with an adjustable member, which, when combined with suitably constructed lures which are attached to fish lines and drawn through water, will cause said lures to descend below the surface of the water, and will also produce a wabbling motion to said lure, that is, will cause said lure to dart from side to side in its forward travel. A further object is to obtain a wabbler by means of which said side to side movement can be varied; and an additional object is to obtain a wabbler of the kind named which is not liable to engage with or pick up weeds when said lure is drawn through water having weeds growing therein; and a yet further object is to obtain a wabbler of the kind named which is economically made, is durable, and is not liable to get out of order.

In the drawing referred to Figure 1 is a section, on line 1—1 of Fig. 2, viewed as indicated by arrows.

Figure 1:
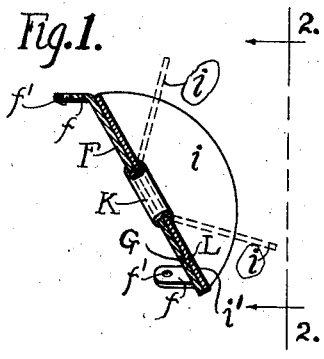
Figure 2:
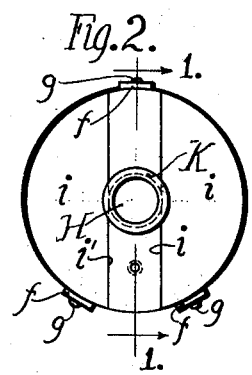
Fig. 2 is a front view, on line 2—2 of Fig. 1, viewed as indicated by arrows.

A reference character applied to designate a given part indicates said part throughout the several figures of the drawings, wherever the same appears.

A represents a lure, substantially cylindrical in form, as at $a$, having the reduced rear end $a'$, and the inclined forward end $a^2$. B, B, respectively represents fish hooks; C a fish line, and D a member by means of which the hooks B, B, and line C are connected together. E represents a rudder member, having for one of its functions the maintenance of the lure in its illustrated position when in and being drawn through water.

Figure 5:
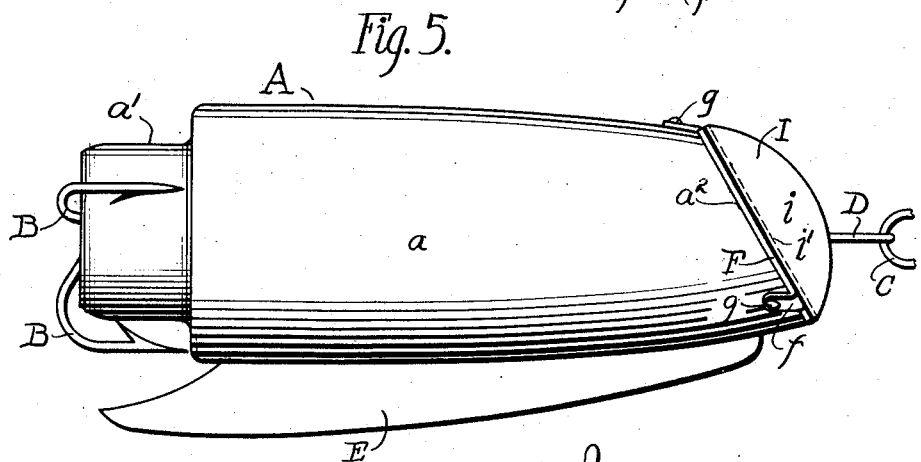
Fig. 5 is a side elevation of a lure with which the wabbler illustrated in Figs. 1 to 4, inclusive, is illustrated as combined.

F represents the stationary member of the wabbler illustrated, which is provided with ears $f, f, f$, having apertures $f', f', f'$, through which apertures brads $g, g$, are illustrated as extending into the body of the lure A, to secure said stationery member rigidly in place on the inclined face ($a^2$) of the forward end of said member A. G, G, represents indentations on the face of member F, and H an aperture therethrough. Broken lines $h, h,$ indicate the lines on which ears $f, f, f$, are bent to bring them into close contact with part $a$ of lure A, as is illustrated in Fig. 5.

I represents a blank from which the adjustable member of the wabbler is obtained. The adjustable member is provided with wings $i, i$, which are obtained by bending blank I on lines $i', i'$, into substantially the position illustrated in Figs. 1 and 5, and indicated by broken lines in Fig. 1.

Figure 3:
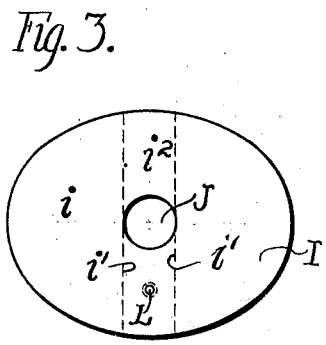
Fig. 3 is a plan view of a blank from which the adjustable member of the wabbler is obtained; bends which are made in said blank being indicated by broken lines.
Figure 4:
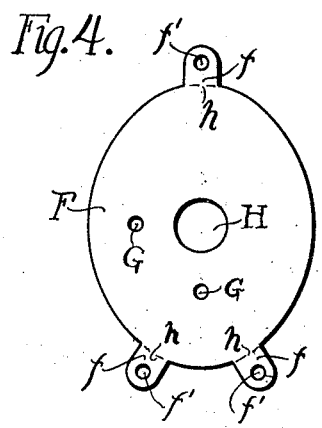
Fig. 4 is a plan view of an additional blank from which the stationary member of the wabbler is obtained.

J, Fig. 3, represents an aperture through member I, and K an eyelet, (as it is called in the stationery trade), by means of which member I is rotatably mounted on member F, said member F serving as a base to said member I. L represents an indentation made in part $i^2$ of member I to obtain a projection on the rear face thereof adapted to register with indentations G, G, respectively, on said member F. The registration of said projection and said indentation tends to maintain member I in an adjusted position.

In operation it is found that in case the lure with which the wabbler is combined is made of material which will cause the combined device to float on the surface of the water when at rest, upon drawing it through said water, by means of line C, it will not remain on said surface, and will not proceed in a straight line; but on the contrary, will descend to a short distance below the surface and will dart from one to the other side of a straight line in its travel through the water.

I claim:

1. A fish lure comprising a cylindrical body provided with an inclined plane at the forward end thereof extending downward and forwardly, in combination with a wabbler comprising a base rigidly secured to said forward end, a movable member provided with wings rigidly set in planes inclined to the planes of the central portion thereof, and an eyelet arranged to rotatably attach said central portion of the movable member to said base.

2. A wabbler comprising a base member provided with projecting lugs, a movable member provided with wings in planes inclined to the central portion thereof, said base member provided with an aperture and said movable member provided with an aperture arranged to register with said first aperture, and an eyelet positioned in said apertures and arranged to rotatably secure said movable member to said base member, in combination with a fish lure, said wabbler secured to the forward end of said lure by means comprising said projecting lugs.

3. A wabbler comprising a base member provided with recesses on the face thereof and with an aperture, a movable member provided with a projection on the rear face thereof and with an aperture, and provided with wings in planes inclined to the central portion of said member, said recesses and projection and said apertures adapted to register, and an eyelet in said aperture arranged to rotatably secure said movable member to said base member.

HENRY L. GOTTSCHALK.

Witnesses:
CHARLES TURNER BROWN,
B. S. BROWN.